C. H. AND W. E. CAMBURN.
AIR PUMP FOR MOTOR VEHICLES.
APPLICATION FILED NOV. 24, 1919.
1,405,397.
Patented Feb. 7, 1922.
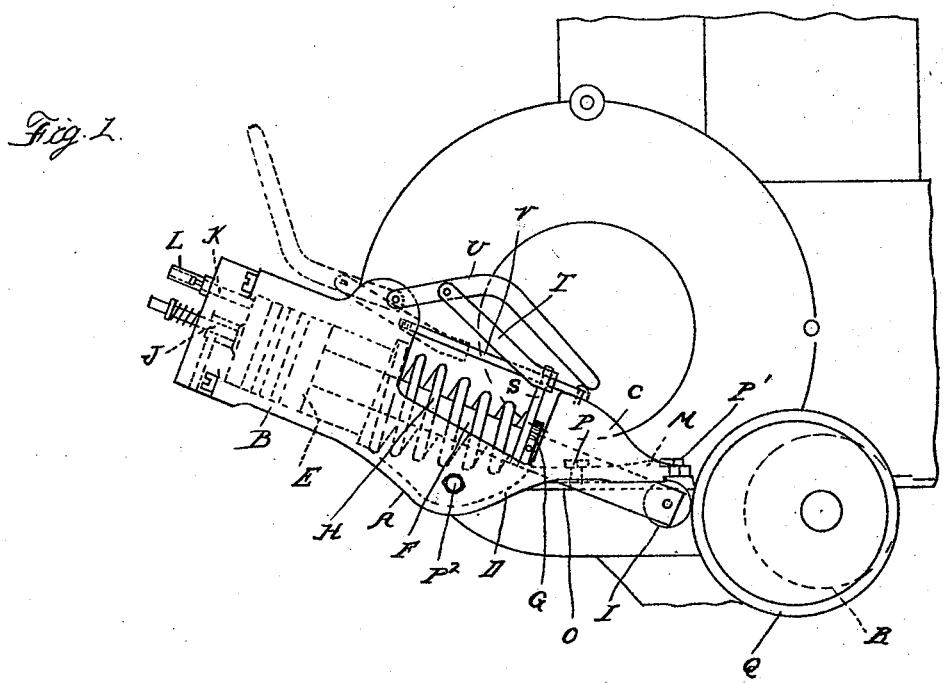
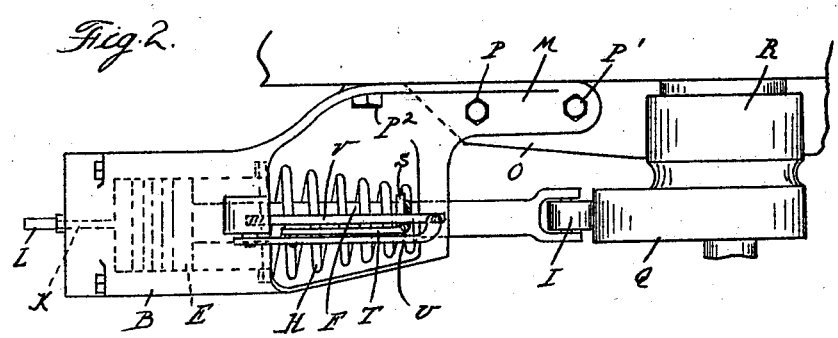
Inventors
Clare H. Camburn
William E. Camburn

UNITED STATES PATENT OFFICE.

CLARE H. CAMBURN AND WILLIAM E. CAMBURN, OF TECUMSEH, MICHIGAN.

AIR PUMP FOR MOTOR VEHICLES.

1,405,397.	Specification of Letters Patent.	Patented Feb. 7, 1922.

Application filed November 24, 1919. Serial No. 340,397.

*To all whom it may concern:*

Be it known that we, CLARE H. CAMBURN and WILLIAM E. CAMBURN, both citizens of the United States of America, residing at Tecumseh, in the county of Lenawee and State of Michigan, have invented certain new and useful Improvements in Air Pumps for Motor Vehicles, of which the following is a specification, reference being had thereto in the accompanying drawings.

The invention relates to air pumps for motor vehicles, being applicable to various constructions of such vehicles, but being particularly designed for use in connection with Ford automobiles. It is the object of the invention to obtain, a construction which is readily attachable to the automobile, which is simple in construction and which may be quickly thrown in or out of operative relation to a driven part of the engine for actuating the same.

In the drawings:

Figure 1 is a side elevation;

Figure 2 is a plan view.

A is a member, preferably an integral casting, having the cylinder portion B, a guide portion C, and an intermediate portion D. E is a piston within the cylinder, and F is a rod extending outward from said piston and through the guide C. G is a collar on the rod F, and H is a spring, preferably of conical form, one end of which abuts against the collar G and the opposite end against the seat at the inner end of the cylinder. I is a roller pivotally mounted in the outer end of the rod F. J is an inlet valve arranged in the head of the cylinder, and K is an outlet valve controlling a port from the cylinder communicating with the fitting L, which is connected with the hose, or other conduit, for the compressed air.

The member A is so fashioned that it will fit against a portion of the engine casing and may be secured thereto by bolts, which are used for connecting other members. Where adapted for use on a Ford car, the member A has an apertured flange M which fits against a flange O of the timing gear housing and is secured thereto by the bolts P P' and P². These bolts normally perform the function of securing the cover of the housing for the timing gears and can be used for the additional function of securing the pump housing. The member A is also of such form that when secured, the end of the rod F having the roller I mounted therein will extend in proximity to the portion of the motor shaft on which the fan belt pulley is mounted. A cam Q on said shaft is adapted to reciprocate the rod I and this cam may be either attached to the fan belt pulley R, or a substitute pulley with the cam formed integral therewith is engaged with the motor shaft. When the pump is not in use, the roller I is withdrawn from the path of the cam by a locking mechanism comprising an arm S on the collar G connected by the link T with a lever U fulcrumed on a portion of the cylinder and adapted, when thrown over its center, to compress the spring F and move the roller I out of the path of the cam. A guide rod V for the outer end of the arm S serves to hold the latter from displacement.

With the construction as shown and described, to attach the pump to the motor the bolts P, P' and P² are removed, the member A placed in position, and clamped by the reinsertion of the bolts. The pulley R is also provided with the cam Q, or a substitute pulley with such cam is placed upon the motor shaft. The lever U is then thrown into position to compress the spring H and to withdraw the roller I from normal contact with the cam. Whenever it is desired to set the pump in operation, the lever U is thrown back into the position shown in Figure 1, which will project the roller I into the path of the cam, whereupon each rotation of the motor shaft will cause a reciprocation of the rod F and piston E. This will cause the compression of air in the cylinder B, which is forced out through the fitting L to the tire. When the pump is not in use, the roller is withdrawn from the path of the cam by locking mechanism comprising the arm S on the collar G adapted to be actuated by a toggle lever, including the lever U and link T. A guide rod V holds the link T in operative relation to the arm S and the arrangement is such that when the lever U, which is fulcrumed on the cylinder, is thrown over its center, the link T will actuate the arm S to compress the spring F and withdraw the roller I out of the path of the cam.

What we claim as our invention is:

1. An air compressor for motor vehicles, comprising a member having a cylindrical portion and an extension in alignment therewith forming a guide, said extension being adapted to fit against a portion of the engine casing and to be secured by bolts of said casing, a piston in said cylinder, a rod extending from said piston through said guide, a spring sleeved upon said rod having one end abutting against said cylinder, a collar on said rod forming a bearing for the opposite end of the spring, means at the end of said rod for engaging a rotating portion of the engine to cause a reciprocation of the rod, and a toggle lever for engaging said collar to retract the same and said rod out of operative relation to said actuating member.

2. An air compressor for motor vehicles, comprising an integral cast member having a cylindrical portion and an extension therefrom fashioned to fit against a portion of the engine casing and to be secured thereto by bolts thereof, said extension also forming a guide for a rod, a piston to which said rod is attached engaging said cylinder, a spring sleeved upon said rod intermediate said cylinder and guide, one end of said spring abutting against the cylinder, a collar on the rod engaging the opposite end of said spring, an arm projecting from said collar, a toggle lever having a link thereof in operative engagement with said arm, a guide for said link and arm, and a cam on the rotating part of the engine operatively engaging the end of said rod to reciprocate the same when said toggle lever is in one position of adjustment, said rod being withdrawn from the path of said cam in another position of adjustment of said toggle.

3. An air compressor for motor vehicles, comprising an integral member having a cylinder portion, a guide portion and a portion for engaging the casing of an engine, being adapted to be secured thereto by bolts of said casing, said member when so secured being arranged to extend radially from the crank shaft of the engine, a piston in said cylinder, a rod for said piston extending through a guide portion of said member, a roller bearing at the outer end of said rod, a spring sleeved upon said piston intermediate the cylinder and said guide, a collar on said rod engaging one end of said spring, the opposite end thereof abutting against said cylinder, a fan belt pulley upon said engine shaft, a cam on said pulley operatively engaging the roll at the end of said rod to reciprocate the same, and means secured to said member for retracting said rod out of operative relation to said cam.

In testimony whereof we affix our signatures.

CLARE H. CAMBURN,
WILLIAM E. CAMBURN.